(12) United States Patent
Song et al.

(10) Patent No.: US 11,939,451 B2
(45) Date of Patent: Mar. 26, 2024

(54) SOLVENTS FOR ACETYLENE FLUID STORAGE

(71) Applicants: Xuemei Song, East Amherst, NY (US); William S. Kane, Tonawanda, NY (US); Ashwini K. Sinha, East Amherst, NY (US)

(72) Inventors: Xuemei Song, East Amherst, NY (US); William S. Kane, Tonawanda, NY (US); Ashwini K. Sinha, East Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 395 days.

(21) Appl. No.: 17/177,636

(22) Filed: Feb. 17, 2021

(65) Prior Publication Data

US 2021/0261751 A1 Aug. 26, 2021

Related U.S. Application Data

(60) Provisional application No. 63/129,805, filed on Dec. 23, 2020, provisional application No. 62/978,989, filed on Feb. 20, 2020.

(51) Int. Cl.
*C08K 5/07* (2006.01)
*C08K 5/01* (2006.01)
*C08K 3/36* (2006.01)

(52) U.S. Cl.
CPC .......... *C08K 5/07* (2013.01); *C08K 5/01* (2013.01); *C08K 3/36* (2013.01)

(58) Field of Classification Search
CPC ... C08K 5/07; C08K 3/36; C09K 3/32; C09K 5/00; C09K 5/04; B65B 31/00; B65B 31/02; C10L 3/04; C10L 3/02; C10L 1/185; C10L 1/1852; C10L 1/1855; C10L 1/1857; C10L 1/20; C10L 1/22; C10L 1/232
See application file for complete search history.

(56) References Cited

U.S. PATENT DOCUMENTS

| | | | | |
|---|---|---|---|---|
| 2,405,693 A | * | 8/1946 | Hamill | C10L 3/04 252/364 |
| 2,431,676 A | | 12/1947 | Bour | |
| 2,580,622 A | | 1/1952 | Du Pont | |
| 2,587,689 A | * | 3/1952 | Box, Jr. | C07C 7/11 585/866 |
| 2,664,997 A | * | 1/1954 | Eck | C10L 3/04 585/864 |
| 2,670,810 A | | 3/1954 | Dorsey | |
| 2,731,507 A | * | 1/1956 | Akin | C07C 7/11 585/860 |
| 2,849,396 A | * | 8/1958 | Nelson | C10G 21/20 95/239 |
| 2,925,384 A | * | 2/1960 | Winnacker | C10L 3/04 252/364 |
| 2,925,385 A | * | 2/1960 | Winnacker | C10L 3/04 585/866 |
| 3,217,467 A | * | 11/1965 | Evans | C10L 3/04 549/416 |
| 4,010,777 A | * | 3/1977 | Mogensen | C10L 3/02 141/4 |
| 4,800,930 A | * | 1/1989 | Rabren | C10L 3/04 141/4 |
| 2009/0305516 A1 | | 12/2009 | Hsu et al. | |
| 2010/0151691 A1 | | 6/2010 | Henri et al. | |
| 2019/0233350 A1 | | 8/2019 | Sankaranarayanan et al. | |

FOREIGN PATENT DOCUMENTS

| | | | | |
|---|---|---|---|---|
| CN | 104030267 A | * | 9/2014 | ............ C01B 31/02 |
| DE | 876397 C | | 5/1953 | |
| DE | 965657 C | | 6/1957 | |
| FR | 895556 A | | 1/1945 | |
| GB | 597972 A | | 2/1948 | |
| GB | 620423 A | | 3/1949 | |
| JP | H07-331266 A | | 12/1995 | |
| JP | H11-106769 A | | 4/1999 | |
| JP | 2006-117825 A | | 5/2006 | |

OTHER PUBLICATIONS

McKinnis, "Solubility of Acetylene in Donor Solvents", Industrial and Engineering Chemistry, vol. 47, No. 4, p. 850-853, Apr. 1955 (Year: 1955).*
Mathieu, "Pencil and Paper Estimation of Hansen Solubility Parameters", ACS Omega, 2018, 3, 17049-17056. published Dec. 11, 2018 (Year: 2018).*
Machine translation CN 104030267 A to Yang et al., published Sep. 10, 2014 (Year: 2014).*
Industrial & Engineering Chemistry, US, 1995, vol. 47, No. 4, 850-853.

* cited by examiner

*Primary Examiner* — Jane L Stanley

(57) ABSTRACT

A composition comprising acetylene fluid at least partially solubilized in an improved solvent is described. The improved solvents exhibit non-toxicity and are further characterized by low vapor pressures to minimize solvent carryover during delivery of the acetylene fluid, while retaining suitable acetylene solubilizing capacity.

8 Claims, 5 Drawing Sheets

FIG. 5

| | Invention | | | | | | Prior Art | | | |
|---|---|---|---|---|---|---|---|---|---|---|
| | Dihydrolevo glucosenone (Cyrene) | Tetraethylene Glycol Dimethyl Ether | Acetic-anhydride | Cyclo-hexanone | Pentoxone | Mesityl Oxide | Dimethyl Formamide | Acetone | N-methyl 2-pyrrolidone | Triethyl Phosphate |
| Molecular Structure | (structure) | H₃C[O]OCH₃ | (structure) | (structure) | (structure) | (structure) | (structure) | (structure) | (structure) | (structure) |
| Classified as H360 | No | No | No | No | No | No | Yes | No | Yes | No |
| Vapor pressure @ 20°C | 0.1 torr | 0.01 torr | 4 torr | 2.9 torr | 2.65 torr | 8.2 torr | 3 torr | 187 torr | 0.24 torr | 0.3 torr |
| δH (MPa$^{0.5}$) | 6.9 | 6.98 | 10.2 | 5.1 | 5.9 | 6.2 | 9.2 | 7 | 6.7 | 9.2 |

SOLVENTS FOR ACETYLENE FLUID STORAGE

RELATED APPLICATIONS

This application claims the benefit of priority from U.S. Application Ser. No. 63/129,805 filed on Dec. 23, 2020, and U.S. Application Ser. No. 62/978,989, filed on Feb. 20, 2020, both of which are incorporated herein by reference, in their respective entireties.

FIELD OF THE INVENTION

The present invention relates to novel compositions of improved solvents solubilized with acetylene fluid. Particularly, the improved solvents exhibit non-toxicity for acetylene fluid storage, dispensing and handling, and are furthermore characterized by low vapor pressures to minimize solvent carryover during delivery of the acetylene fluid, while retaining suitable acetylene solubilizing capacity.

BACKGROUND OF THE INVENTION

Acetylene is used widely in the industry for a variety of applications including, by way of example, welding and chemical synthesis. Of particular significance, acetylene has been used increasingly as a source material for depositing carbon and carbon-containing films in the electronic industry. Applications include the deposition of amorphous carbon hard mask films.

However, due to its thermal instability, the storage of acetylene has posed several challenges. Acetylene can decompose explosively into carbon and hydrogen under storage conditions of high pressure and temperature, even in the absence of air or oxygen.

To address the thermal instability, acetylene cylinders are constructed uniquely. Each cylinder contains a porous filler (e.g., silica) with a solvent that has typically included acetone, dimethylformamide (DMF) or N-methylpyrrolidone (NMP) distributed throughout the porous filler media. These solvents have been traditionally selected as a result of their capacity for solubilizing acetylene. The porous filler media is a porous mass generally having a porosity of around 90% by volume. The function of the porous filler media is to separate acetylene into small units in the pores that help to inhibit the decomposition of acetylene. The function of the solvent is to absorb large amounts of acetylene at relatively low pressures to enable high cylinder loading in low pressure cylinders. The solvent is dispersed in the voids of the porous filler media as well as around the porous filler media.

Despite improved thermal stability in such cylinder systems, the Applicants have discovered that specific modifications to the existing acetylene cylinder fluid supply packages results in improved storage, handling and delivery capabilities, as will now be explained.

SUMMARY OF THE INVENTION

In one aspect, a composition comprising a solution of an improved solvent in combination with acetylene dissolved within the improved solvent, said improved solvent characterized by all of the following attributes: (i) a vapor pressure at 20 deg C. of approximately 6 torr or less; (ii) a Hansen solubility factor (dH) greater than about 5 MPa$^{0.5}$; (iii) higher non-toxicity in comparison to dimethylformamide (DMF) and N-methylpyrrolidone (NMP); and (iv) a chemical structure comprising at least one of O, N or F atoms, wherein the at least one of said O, N or F atoms is not bonded to a hydrogen atom, and further wherein said chemical structure is characterized by an absence of phosphorus, boron, calcium and nickel.

In a second aspect, an acetylene fluid supply package, comprising a pressure vessel; a porous filler in the pressure vessel; an improved solvent within the porous filler, said solvent solubilizing with acetylene absorbed within the improved solvent; said improved solvent comprising all of the following attributes: (i) a vapor pressure at 20 deg of approximately 6 torr or less; (ii) a Hansen solubility factor (dH) greater than about 5 MPa$^{0.5}$; (iii) higher non-toxicity in comparison to dimethylformamide (DMF) and N-methylpyrrolidone (NMP); and (iv) a chemical structure comprising O, N or F atoms, wherein at least one of said O, N or F atoms is not bonded to a hydrogen atom, and further wherein said chemical structure is characterized by an absence of phosphorus boron, calcium and nickel.

In a third aspect, a system comprising at least one acetylene fluid supply package and an acetylene-utilizing process tool in fluid communication with the at least one acetylene fluid supply package, said at least one acetylene fluid supply package, comprising a pressure vessel; a porous filler in the pressure vessel; an improved solvent within the porous filler, said solvent solubilizing with acetylene absorbed within the improved solvent; said improved solvent comprising all of the following attributes: (i) a vapor pressure at 20 deg of approximately 6 torr or less; (ii) a Hansen solubility factor (dH) greater than about 5 MPa$^{0.5}$; (iii) higher non-toxicity in comparison to dimethylformamide (DMF) and N-methylpyrrolidone (NMP); and (iv) a chemical structure comprising O, N or F atoms, wherein at least one of said O, N or F atoms is not bonded to a hydrogen atom, and further wherein said chemical structure is characterized by an absence of phosphorus, boron, calcium and nickel; wherein the at least one acetylene fluid supply package is configured to allow a discharge of the acetylene fluid under dispensing conditions; and further wherein said acetylene-utilizing process tool is configured to receive the acetylene fluid from the at least one acetylene fluid supply package.

BRIEF DESCRIPTION OF THE DRAWINGS

FIG. 5 lists DMF, acetibem and NMP under the caption Prior Arts as representative of traditional solvents used to store acetylene, and lists solvents under the caption Invention as representative of the present invention.

DETAILED DESCRIPTION OF THE INVENTION

Figure 1:
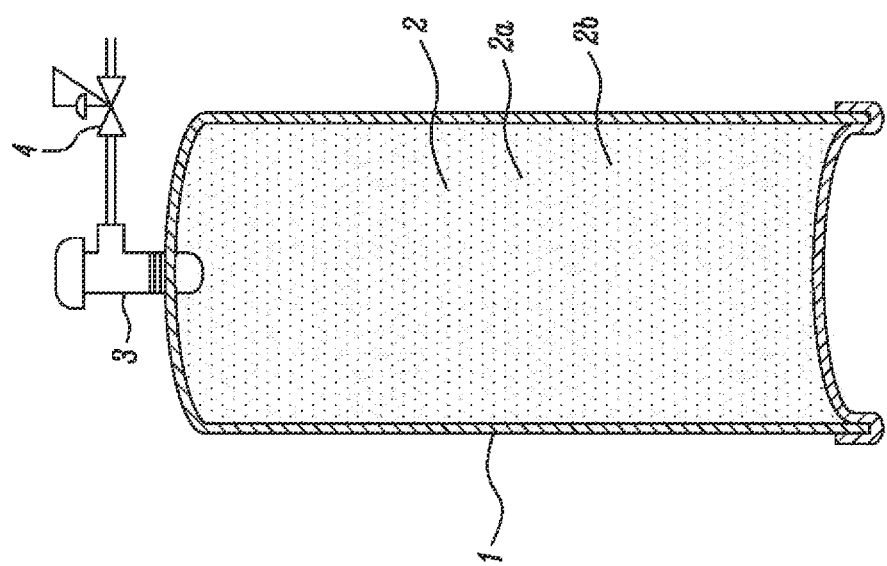
FIG. 1 is a representative schematic of an acetylene fluid supply package with an improved solvent in combination with an acetylene fluid at least partially solubilized within the improved solvent.

The compositions, fluid supply packages and systems disclosed herein may comprise, consist, or consist essentially of any of the specific components and structures illustratively described herein. The disclosure further contemplates restrictively defined compositions, fluid supply packages, and systems, e.g., wherein one or more of the specifically described parts, components, and structures may be specifically omitted, in defining operative embodiments of the present disclosure.

As used herein and throughout, the term "fluid" is intended to include gases, vapors, liquids, and mixtures of the foregoing. "Acetylene fluid" as described herein and throughout is intended to mean substantially all of the acetylene is stored under pressure in the gas phase during storage in a container, but may incorporate a small amount of solvent carryover when the acetylene fluid is withdrawn from the container. The term "solvent" or "solvent fluid" is intended to substantially refer to the solvent in the liquid phase in substantial equilibrium with a corresponding vapor phase of relatively low vapor pressure.

"Container" or "cylinder", or "package" or "delivery package" or "fluid supply package" any of which may be used herein and throughout interchangeably means any storage, filling, delivery or transportable vessel.

"Approximately" as used herein and throughout with respect to vapor pressure, means+/−3 torr.

The present invention recognizes shortcomings of existing acetylene fluid supply packages. For example, the Applicants have observed that acetone when utilized as a solvent has an unacceptably high vapor pressure and therefore the acetone vapor can be withdrawn from the storage container and undesirably transported along with dispensed acetylene. The acetone solvent becomes a contaminant in acetylene for several applications such as deposition of carbon and carbon-containing films, including amorphous carbon hard mask films in the electronic industry. Thus, the acetone can ultimately reduce the film deposition rate and affect process uniformity and consistency.

To reduce contamination in those applications where solvent impurities cannot be tolerated in the resultant carbon-containing films derived from acetylene, alternative solvents with lower vapor pressure in comparison to acetone have been utilized for acetylene storage and delivery. For example, DMF and N-methylpyrrolidone (NMP) have been utilized as solvents, as part of acetylene fluid supply packages. However, both DMF and NMP exhibit toxicity. In particular, DMF and NMP pose risks of reproductive toxicity (i.e., teratogenicity). Because of such health risks, commercial usage of DMF and NMP has been restricted in several countries. Materials which pose a risk of reproductive toxicity are classified as having a H360 hazard statement code under the Globally Harmonized System of Classification and Labelling of Chemicals (GHS), It should be understood that toxicity as used herein refers to those materials which are classified as having a H360 hazard statement code.

Accordingly, given such drawbacks with the usage of traditional solvents in acetylene storage and delivery systems, Applicants have identified improved solvents that are a safer alternative to traditional solvents for storage and delivery of acetylene. A combination of certain attributes is required for the present invention. —The attributes of the improved solvents are characterized as having (i) a vapor pressure at 20 deg C. of approximately 6 torr or less; (ii) higher non-toxicity in comparison to dimethylformamide (DMF) and N-methylpyrrolidone (NMP); (iii) a chemical structure comprising at least one of —O, N or F atoms, wherein the at least one of said O, N or F atoms is not bonded to a hydrogen atom, and further wherein said chemical structure is characterized by an absence of phosphorus, boron, calcium and nickel; and (iv) a Hansen solubility factor (dH) greater than about 5 $MPa^{0.5}$. The improved solvents by virtue of possessing the foregoing attributes can be used as part of an acetylene storage and delivery system, which do not exhibit a drop-off in acetylene solubilizing performance relative to traditional solvents.

Traditional solvents on the contrary, such as DMF and NMP, are generally classified as H360 under the global harmonized system of classification and labeling of chemicals (see FIG. 5). In other words, they pose a risk of reproductive toxicity and teratogenicity. The inventive solvents do not pose a risk of reproductive toxicity and, as such, are characterized by an absence of the H360 hazard statement code as classified by the GHS. The inventive solvents are generally more benign as a result of the absence of H360 classification.

In addition to the higher non-toxicity, the inventive solvents maintain sufficient solubility and interaction with acetylene. The Applicants have identified a combination of attributes necessary to provide effective solubility of the solvent within acetylene fluid. The solvent molecule and acetylene molecule attract each other such that at least a portion of the acetylene molecule can reside within the solvent at a thermodynamically stable state. To the contrary, if the solvent molecules and acetylene molecules repel each other, then acetylene solubility in the solvent is expected to be insufficient (i.e., having a solubility within acetylene less than that of traditionally used solvents of DMF, acetone and NMP). Acetylene has a chemical structure of C2H2 with a triple bond between the carbon atoms. Each of the carbon atoms is covalently bonded to a hydrogen atom, which represents an available center to interact with molecules of the solvent. This hydrogen atom can preferably hydrogen bond with a negative site in the solvent molecule to enable sufficient solubility. Such a negative polarity site can be made available by choosing a polar solvent with an electronegative site provided via a N, O or F atom. The acetylene solubility in the solvent increases with the solvent's potency to hydrogen bond with the acetylene molecule. The Applicants have discovered that the potency of hydrogen bonding can be reliably assessed by a Hansen-solubility interaction parameter, designated as δh, which is defined in the art as the energy from hydrogen bonds between molecules. This parameter signifies how strongly the solvent can form either an intramolecular or intermolecular hydrogen bond. The higher the value of δh, the higher the potency of solvent to form hydrogen bonds therewith. With regards to the present invention, a higher δh for a particular solvent is indicative of greater solubility of acetylene fluid within the solvent molecules. In a preferred embodiment, δh is greater than about 5 $MPa^{0.5}$.

Another attribute necessary in the present invention is the avoidance, reduction or minimization of O—H, F—H or N—H bonds within the solvent molecule, such that the molecular structure of the solvent contains at least one O, N or F atom not bonded with a H atom within the solvent molecule. Applicants have discovered that an overabundance of O—H, F—H or N—H bonds within the solvent molecule can lead to the solvent molecule having a tendency to self-hydrogen bond with itself, thereby potentially limiting the availability of electronegative sites for hydrogen bonding to occur with an acetylene molecule and thereby create intermolecular hydrogen bonds. By way of example, and not intending to be limiting, if a solvent molecule contains two oxygen atoms, at least one of the two oxygen atoms cannot be bonded to a hydrogen atom within the molecule to reduce the tendency for self-hydrogen bonding within the solvent molecule.

The combination of (i) a sufficiently high δh with (ii) a molecular structure of a solvent that contains at least one O, N or F atom not bonded with a H atom therewithin promotes the ability of the solvent molecule to more effectively interact and solubilize with the acetylene molecule. In other words, the combination of δh greater than about 5 MPa$^{0.5}$ in combination with solvent structure that avoids or minimizes intramolecular H-bonding within the solvent molecule can facilitate H-bonding between the solvent and acetylene molecules.

While providing non-toxicity and effective solubility of the solvent with acetylene fluid are critical, the present invention further requires that the solvent molecule exhibits relatively low vapor pressure to reduces its carryover during dispensing of acetylene. In this regard, the solvents of the present invention have a vapor pressure at 20 degree Celsius that is approximately 6 torr or less. Utilizing solvent molecules with lower vapor pressures minimizes contamination of the acetylene that is dispensed to a downstream application. The relatively lower vapor pressure of the solvents of the present invention enables minimal carryover of the solvent during dispensation of acetylene, thereby allowing delivery of high purity acetylene. On the contrary, conventional solvents such as acetone have a vapor pressure of 230 torr which poses large amounts of contaminant risks (FIG. 5) as a result of a large amount of acetone having a tendency to be withdrawn with the acetylene from the container.

Having described all the necessary attributes of the inventive solvents, FIG. 5 depicts representative non-limiting examples of solvents in accordance with the principles of the present invention. The solvents are compared with prior art solvents. As can be seen, mesityl oxide, dihydrolevoglucosenone; tetraethylene glycol dimethyl ether; acetic anhydride; cyclohexanone; and pentoxone are solvents expected to be safer in handling and exhibit sufficient solubility with acetylene fluid within a container. All of the inventive solvents are characterized by an absence of H360 classification; exhibit relatively low vapor pressure of approximately 6 torr or less; have a Hansen-solubility interaction parameter, designated as δh, of greater than about 5 MPa$^{0.5}$; and a molecular structure that eliminates, reduces or minimizes O—H, F—H or N—H bonds within the solvent molecule, such that the molecular structure of the solvent contains at least one O, N or F atom not bonded with a H atom within the solvent molecule; and additionally whereby no P, B, Ca and Ni atoms are contained in the solvent chemical structure. The combination of these attributes represents a significant improvement and departure over traditional solvents used for storage and delivery of acetylene. FIG. 5 lists DMF, acetone, and NMP under the caption Prior Art as representative of traditional solvents used to store acetylene. As can be seen, the traditional solvents have one or more deficiencies, such as H360 toxicity and/or unacceptably high vapor pressure. The Hansen solubility factor (dH) values were generated using software commercially available as HSPiP software and with an official site at https://www.hansen-solubility.com/contact.php.

It should be understood other solvents not in FIG. 5 are contemplated by the present invention, including, but not limited to, acetyl pyrrolidone.

Figure 2:
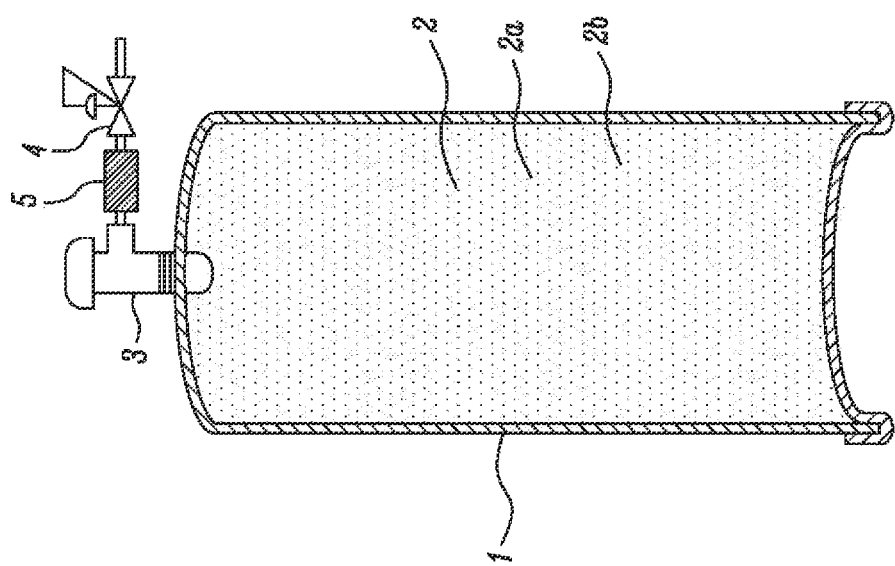
FIG. 2 is a representative schematic of FIG. 1 with a solvent trap device.
Figure 3:
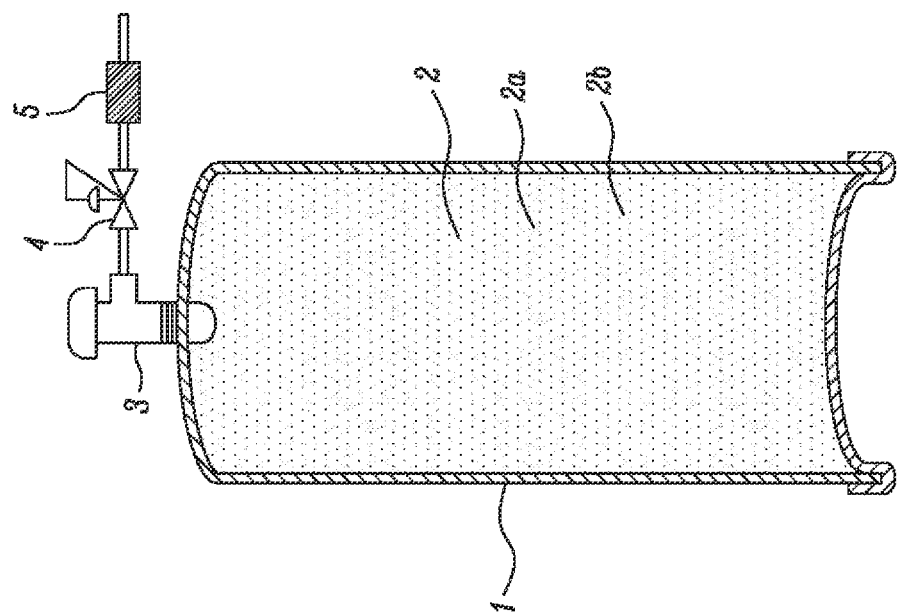
FIG. 3 is a variation of FIG. 2, whereby the solvent trap device is located in a different position.

FIGS. 1, 2 and 3 show examples of representative acetylene storage and delivery systems with the inventive solvents loaded therein. FIG. 1 shows a storage container 1 having an interior volume occupied with porous media 2 (e.g., silica) pre-loaded within the container 1. One or more of the solvents 2a of the present invention are dispersed or loaded into the porous media 2 and around the porous media 2. C2H2 is stored by solubilizing C2H2 (2b) in the solvent to a desired pressure. Typical fill pressure ranges from 200-300 psig at ambient conditions. A pressure regulator device (4) is installed at the outlet of the cylinder to reduce the outlet pressure to a desired pressure (approximately 15-30 psig) before connecting to flow control devices for ease of operation. A shutoff valve 3 is shown along the top of the container 1. The acetylene fluid 2b is at least partially solubilized within the improved solvent 2a.

FIG. 2 shows the container 1 of FIG. 1 with at least a portion of acetylene fluid 2b solubilized within one or more of the inventive solvents 2a that is dispersed within and around the porous media 2 in combination with a solvent trap 5. A cylinder or storage container (1) filled with a porous filler material (2) is loaded with a desired solvent (2a). The solvent disperses in the voids within and around the porous filler material. C2H2 is stored by solubilizing C2H2 (2b) in the solvent to a desired pressure. Typical fill pressures range from 200-300 psig at ambient conditions. The solvent trap 5 is a canister containing an adsorbent material (5) that is installed at the outlet of the cylinder and upstream of pressure regulating device 4. It should be understood that the canister can be loaded with any suitable desired adsorbent media such as activated carbon, zeolite or a metal organic framework which is capable of trapping the inventive solvent that may be passing through it as a result of being withdrawn from the interior volume of the container 1. In this manner, the removal of any carry-over solvent can be achieved, thereby improving the purity of delivered acetylene desired for critical application like deposition of carbon films for electronic device fabrication.

FIG. 3 shows another embodiment with the canister containing adsorbent material (5) that is installed downstream of pressure regulating device.

It should be understood that FIGS. 1, 2 and 3 represent non-limiting examples of a storage and delivery package with the improved solvents 2a, porous media 2 and acetylene 2b. Other configurations to the storage and delivery package are contemplated without departing from the scope of the present invention. For example, the acetylene fluid supply packages of the present disclosure may be of any configuration that is suitable to contain the acetylene fluid 2b during storage and transport conditions, and to discharge the acetylene fluid 2b from the fluid supply package 1 under dispensing conditions. It should be understood that a single solvent 2a may be utilized or a mixture of two or more solvents 2a may be utilized, where the resultant mixture is characterized by each of the attributes required by the present invention as has been discussed hereinbefore. The dispensing conditions may be accommodated by actuating the fluid dispensing assembly to effect dispensing, e.g., by opening of a valve in a valve head of the fluid dispensing assembly of the package.

Figure 4:
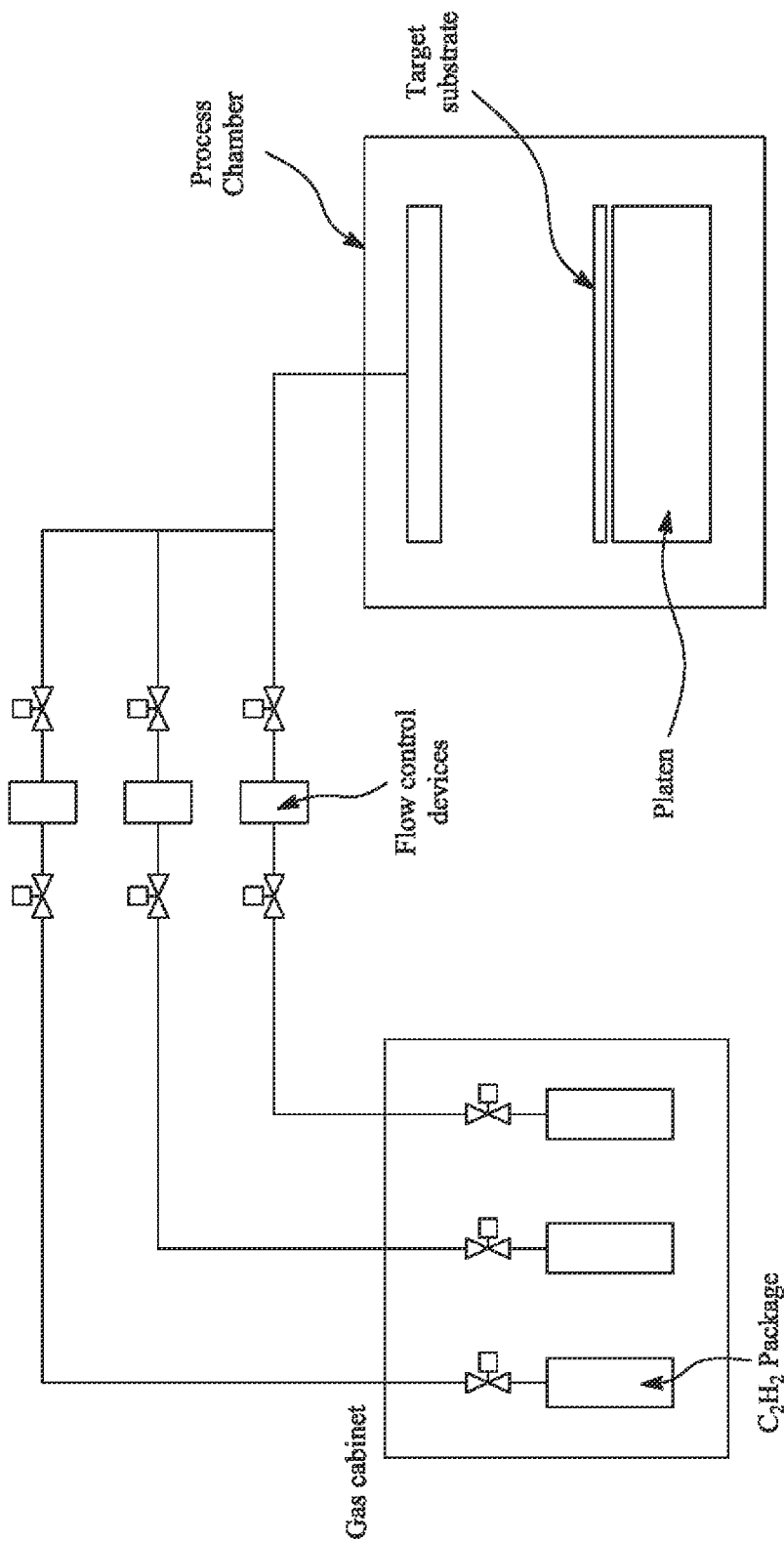
FIG. 4 represents a process diagram that shows a representative method of using the acetylene fluid supply package with a downstream process tool.

The present invention contemplates various fields of use for the compositions described herein. For example, some methods include but are not limited to chemical vapor deposition, plasma enhanced chemical vapor deposition, beam line ion implantation and plasma immersion ion implantation. One example of the usage of the acetylene delivery package of the present invention is shown in FIG. 4. FIG. 4 shows the use of the acetylene delivery package operably connected to certain process equipment in a process to deposit carbon films for electronic devices manufacturing applications. One or more acetylene delivery packages are configured within a gas cabinet. The acetylene is withdrawn from either the acetylene delivery package of FIG. 1, FIG. 2 or FIG. 3 and then the acetylene is dispensed into the processing chamber via a flow control device that can be configured to establish a flow rate of the acetylene that may range from 0.1 slpm to 10 slpm. The process chamber is preferably maintained at a pressure in the range of 0.1-10 torr. The target substrate is heated to elevated temperatures in the range of 100° C. to 800° C. to assist in the deposition of high purity carbon films. The processing chamber may be equipped with a plasma source to assist in the carbon deposition process. It should be understood that the acetylene delivery package can be operated at other flow rates, temperatures, and pressures.

It further should be understood that multiple acetylene delivery packages as shown in FIG. 1 can be loaded into the gas cabinet. The outlet of each of the acetylene delivery packages are connected to dedicated flow control devices, each of which route into an inlet of a process chamber. The acetylene can be stored at a pressure of up to about 300 psig in each of the delivery packages. Upon actuating the shutoff valve into the open position, a controlled flow of acetylene will dispense from its dedicated container.

It further should be understood that multiple acetylene delivery packages may be manifolded together to form a bundle of packages and then the combined flow line is split into different flow lines each connected to a dedicated flow control device.

The carbon films as deposited can be used for a variety of application including, but not limited to, protective layers over underlying film during subsequent etching process steps, or conductive carbon films for transport of electrons. Many of the applications are sensitive to impurities or unwanted contamination, and as such contamination can adversely affect films properties including their optical properties, electrical properties or robustness in other subsequent processes. In such scenarios, the supply of acetylene stabilized in solvent containing reactive elements can form non-volatile reaction products under deposition conditions, which is undesired. Even a relatively low vapor pressure solvent may transport to the process chamber in varying trace amounts and adversely impact film properties. For this reason, solvents for acetylene that contain metals or inorganic impurities like boron, calcium, nickel and phosphorus is undesired for this application. In this regard, one of the attributes of the present invention is that the chemical structure is characterized by an absence of boron, calcium, nickel and phosphorus.

The ability of the present invention to produce high purity films is an advantage over conventional solvents such as acetone, which serves as a contaminant for several applications described above where a high purity acetylene is required. Acetone serves as a contaminant which can adversely impact the properties of carbon films utilized during fabrication of electronic devices.

As has been described, the present invention presents a novel solvent that exhibits higher non-toxicity that is characterized by an absence of a H360 hazard statement code while still maintaining acetylene solubilizing capacity in a manner that allows high purity acetylene product to be withdrawn from a storage and delivery container.

Each of the improved solvents 2a has a different solubilizing capacity for acetylene 2b, which translates into a specific volume expansion of the solvent 2a within cylinder 1. The loading of each of the solvents 2a into cylinder 1 must be determined solvent-by-solvent and takes into account the volume expansion of a particular solvent 2a as a result of the gaseous acetylene 2b dissolving therein, such that sufficient free space of at least about 10% of the cylinder free volume is maintained in the cylinder 1 to ensure the cylinder will not become hydraulic full. Additionally, the amount of loading for each of the improved solvents 2a must allow for sufficient acetylene to be dissolved therein without overpressurizing the cylinder 1. Accordingly, the criticality of the loading parameters of each of the improved solvents 2a into cylinder 1 of the present invention is a unique value, as has been experimentally determined by Applicants. For example, the amount of mesityl oxide that can be loaded into cylinder 1 is no greater than about 0.54 kg of mesityl oxide per liter of cylinder volume, preferably no greater than about 0.51 kg of mesityl oxide per liter of cylinder volume and more preferably, no greater than about 0.49 kg of mesityl oxide per liter of cylinder volume. In another example, the amount of pentoxone that can be loaded into cylinder 1 is no greater than about 0.55 kg of pentoxone per liter of cylinder volume, preferably no greater than about 0.53 kg of pentoxone per liter of cylinder volume and more preferably, no greater than about 0.50 kg of pentoxone per liter of cylinder volume.

While it has been shown and described what is considered to be certain embodiments of the invention, it will, of course, be understood that various modifications and changes in form or detail can readily be made without departing from the spirit and scope of the invention. It is, therefore, intended that this invention not be limited to the exact form and detail herein shown and described, nor to anything less than the whole of the invention herein disclosed and hereinafter claimed.

The invention claimed is:
1. An acetylene fluid supply package, comprising:
   a pressure vessel;
   a porous filler in the pressure vessel;
   an improved solvent within the porous filler, said solvent solubilizing with acetylene absorbed within the improved solvent;
   said improved solvent comprising all of the following attributes:
   (i) a vapor pressure at 20 deg of approximately 6 torr or less;
   (ii) a Hansen solubility factor (dH) greater than about 5 MPa0.5;
   (iii) higher non-toxicity in comparison to dimethylformamide (DMF) and N-methylpyrrolidone (NMP); and
   (iv) a chemical structure comprising O, N or F atoms, wherein at least one of said O, N or F atoms is not bonded to a hydrogen atom, and further wherein said chemical structure is characterized by an absence of phosphorus boron, calcium and nickel;
   wherein the improved solvent is mesityl oxide, said mesityl oxide loaded into the pressure vessel in an amount no greater than about 0.54 kg of mesityl oxide per liter of volume of the pressure vessel.

2. The acetylene fluid supply package of claim 1, wherein the improved solvent is mesityl oxide, said mesityl oxide loaded into the pressure vessel in an amount no greater than about 0.51 kg of mesityl oxide per liter of volume the pressure vessel.

3. The acetylene fluid supply package of claim 1, wherein the improved solvent is mesityl oxide loaded into the pressure vessel in an amount no greater than about 0.49 kg of mesityl oxide per liter of volume of the pressure vessel.

4. A system comprising at least one acetylene fluid supply package and an acetylene-utilizing process tool in fluid communication with the at least one acetylene fluid supply package, said at least one acetylene fluid supply package comprising
- a pressure vessel;
- a porous filler in the pressure vessel;
- an improved solvent within the porous filler, said improved solvent solubilizing with acetylene absorbed within the improved solvent;
- said improved solvent comprising all of the following attributes:
  - (i) a vapor pressure at 20 deg of approximately 9 torr or less;
  - (ii) a Hansen solubility factor (dH) greater than about 5 MPa0.5;
  - (iii) higher non-toxicity in comparison to dimethylformamide (DMF) and N-methylpyrrolidone (NMP); and
  - (iv) a chemical structure comprising O, N or F atoms, wherein at least one of said O, N or F atoms is not bonded to a hydrogen atom, and further wherein said chemical structure is characterized by an absence of phosphorus, boron, calcium and nickel;
- wherein the at least one acetylene fluid supply package is configured to allow a discharge of the acetylene fluid under dispensing conditions; and
- further wherein said acetylene-utilizing process tool is configured to receive the acetylene fluid from the at least one acetylene fluid supply package.

5. An acetylene fluid supply package, comprising:
a pressure vessel;
a porous filler in the pressure vessel;
an improved solvent within the porous filler, said solvent solubilizing with acetylene absorbed within the improved solvent;
said improved solvent comprising all of the following attributes:
- (i) a vapor pressure at 20 deg of approximately 6 torr or less;
- (ii) a Hansen solubility factor (dH) greater than about 5 MPa0.5;
- (iii) higher non-toxicity in comparison to dimethylformamide (DMF) and N-methylpyrrolidone (NMP); and
- (iv) a chemical structure comprising O, N or F atoms, wherein at least one of said O, N or F atoms is not bonded to a hydrogen atom, and further wherein said chemical structure is characterized by an absence of phosphorus boron, calcium and nickel;
- wherein the improved solvent is pentoxone, said pentoxone loaded into the pressure vessel in an amount no greater than about 0.55 kg of pentoxone per liter of volume of the pressure vessel.

6. The acetylene fluid supply package of claim 5, wherein the improved solvent is pentoxone, said pentoxone loaded into the pressure vessel in an amount no greater than about 0.53 kg of pentoxone per liter of volume of the pressure vessel.

7. The acetylene fluid supply package of claim 5, wherein the improved solvent is pentoxone, said pentoxone loaded into the pressure vessel in an amount no greater than about 0.50 kg of pentoxone per liter of volume of the pressure vessel.

8. A system comprising at least one acetylene fluid supply package and an acetylene-utilizing process tool in fluid communication with the at least one acetylene fluid supply package, said at least one acetylene fluid supply package comprising
- a pressure vessel;
- a porous filler in the pressure vessel;
- an improved solvent within the porous filler, said improved solvent solubilizing with acetylene absorbed within the improved solvent;
- said improved solvent comprising all of the following attributes:
  - (i) a vapor pressure at 20 deg of approximately 6 torr or less;
  - (ii) a Hansen solubility factor (dH) greater than about 5 MPa0.5;
  - (iii) higher non-toxicity in comparison to dimethylformamide (DMF) and N-methylpyrrolidone (NMP); and
  - (iv) a chemical structure comprising 0, N or F atoms, wherein at least one of said 0, N or F atoms is not bonded to a hydrogen atom, and further wherein said chemical structure is characterized by an absence of phosphorus, boron, calcium and nickel;
- wherein the at least one acetylene fluid supply package is configured to allow a discharge of the acetylene fluid under dispensing conditions; and
- further wherein said acetylene-utilizing process tool is configured to receive the acetylene fluid from the at least one acetylene fluid supply package; and further wherein the improved solvent is either mesityl oxide, said mesityl oxide loaded into the pressure vessel in an amount no greater than about 0.54 kg of mesityl oxide per liter of volume of the pressure vessel, or pentoxone, said pentoxone loaded into the pressure vessel in an amount no greater than about 0.55 kg of pentoxone per liter of volume of the pressure vessel.

* * * * *